May 16, 1933.  J. KUCHAR  1,908,711
VEHICLE DRAFT APPLIANCE
Filed Feb. 21, 1930  3 Sheets-Sheet 1
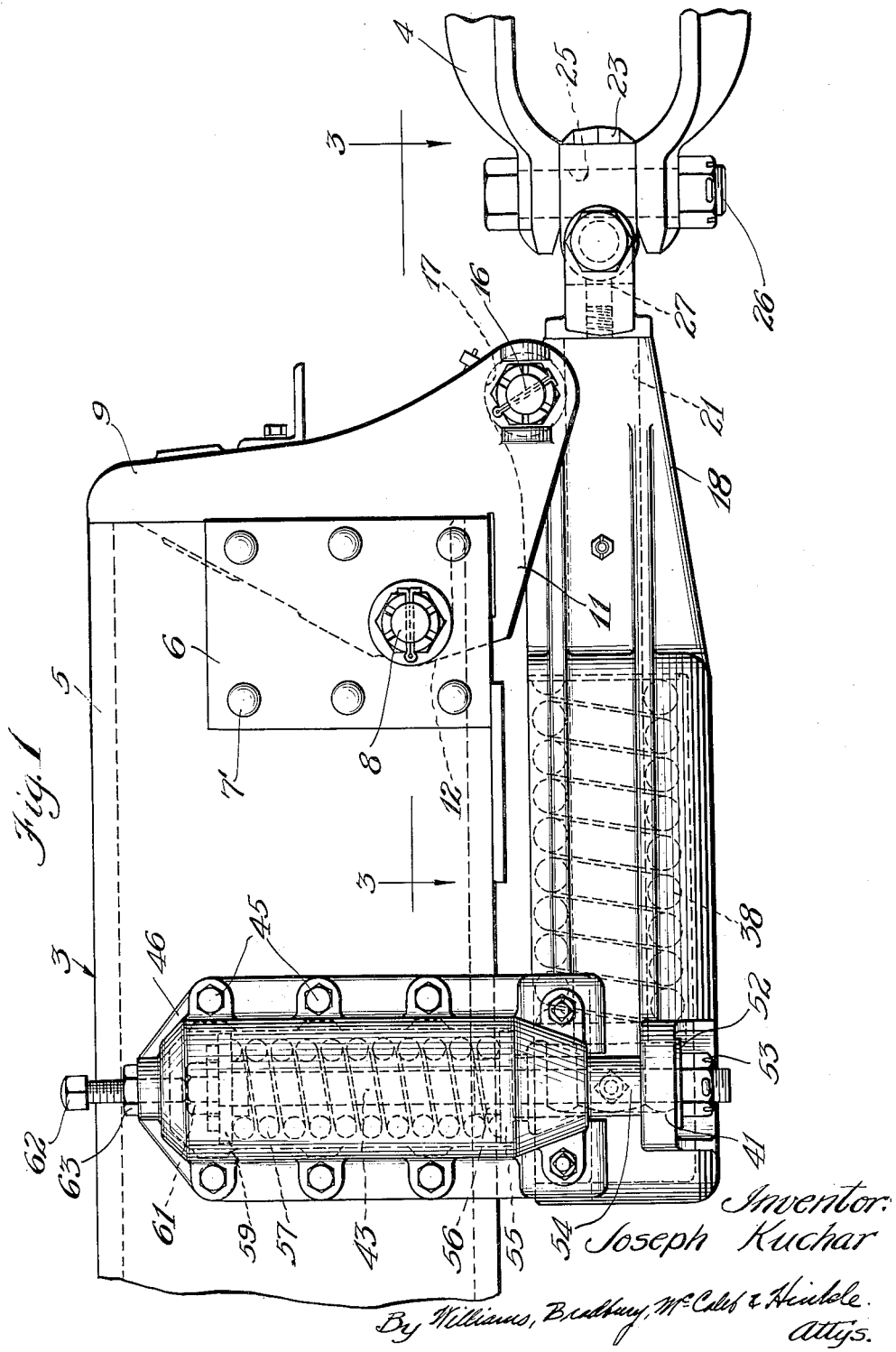
Inventor:
Joseph Kuchar
By Williams, Bradbury, McCaleb & Hindle
Attys.

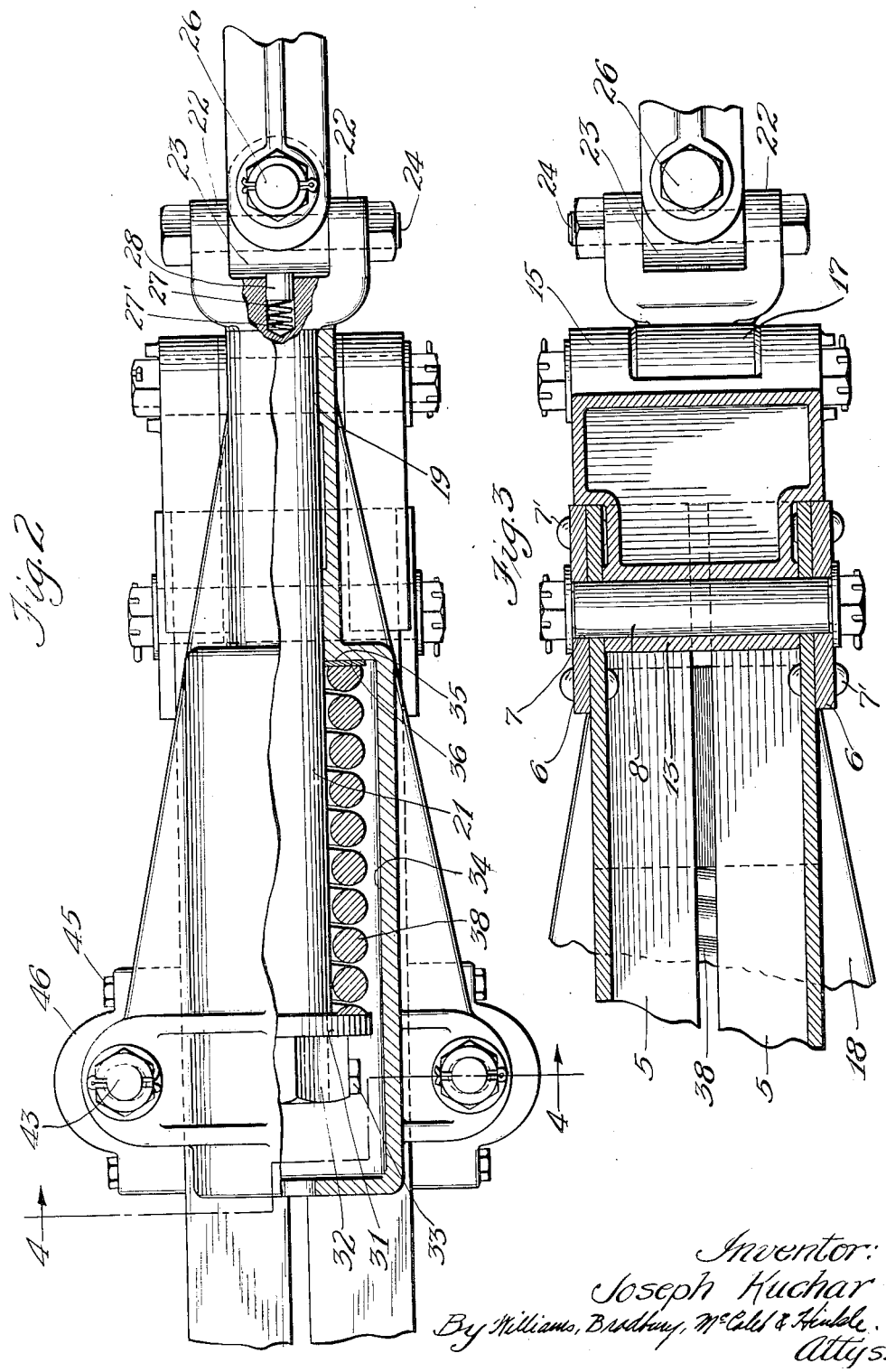

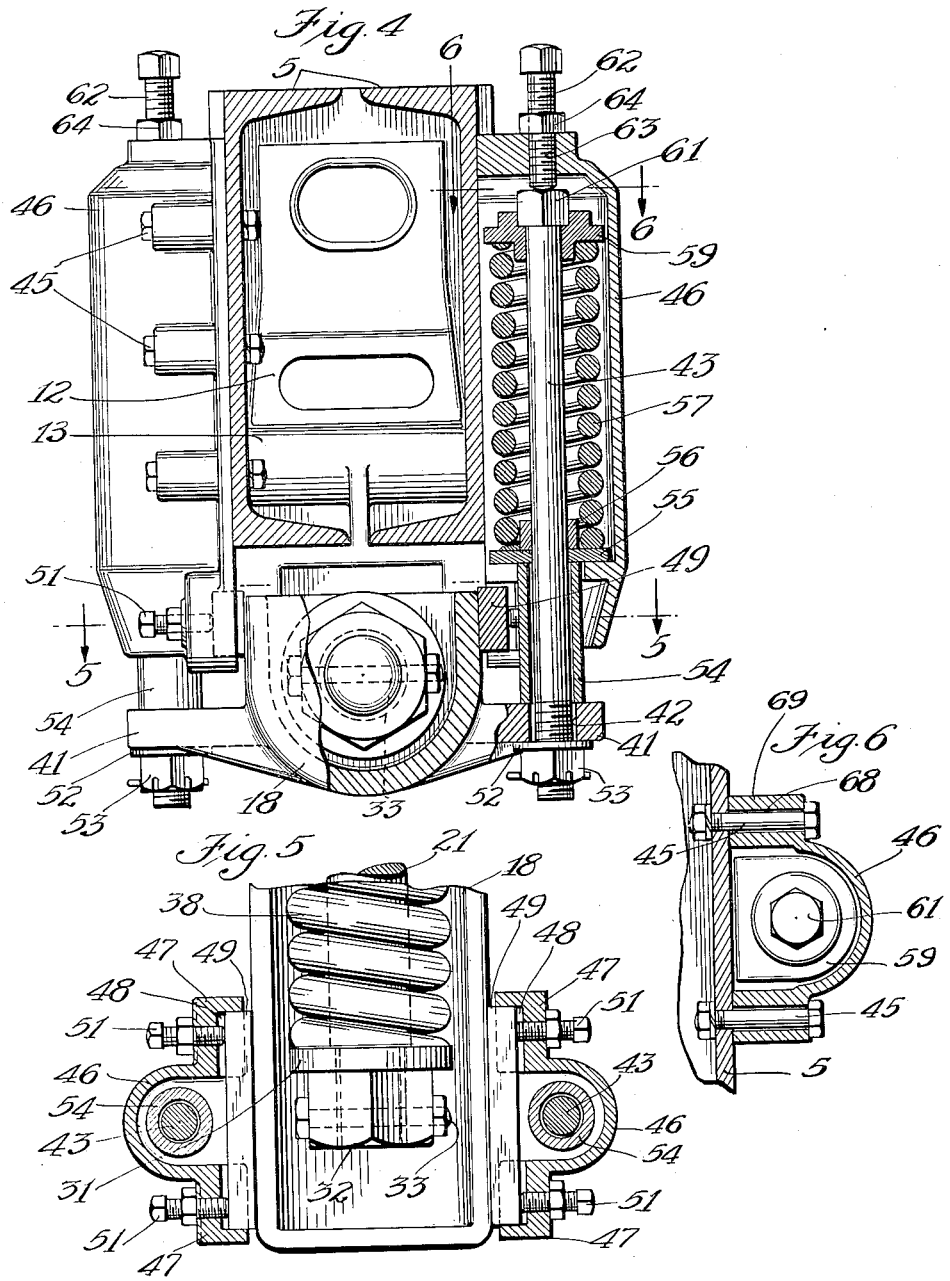

Patented May 16, 1933

1,908,711

UNITED STATES PATENT OFFICE

JOSEPH KUCHAR, OF CHICAGO, ILLINOIS, ASSIGNOR TO ATHEY TRUSS WHEEL CO., OF CHICAGO, ILLINOIS, A CORPORATION OF ILLINOIS

VEHICLE DRAFT APPLIANCE

Application filed February 21, 1930. Serial No. 430,156.

This invention relates to a vehicle draft appliance and more particularly to a draft appliance incorporating a shock absorbing mechanism.

An object of this invention is the provision of a novel draft appliance for use in combination with a rigid draw bar forming a part of the frame of a heavy vehicle chassis.

Another object is the provision of such an appliance incorporating a shock absorbing mechanism adapted to yield longitudinally when a drawing force of a tractor or other power traction device is applied thereto and to yield vertically to absorb loading and roading shocks. The longitudinal yielding allows the traction device to gain momentum and prevents severe stresses in the drawn vehicle which would otherwise be produced by sudden jerking action of the tractor. By the use of this invention the likelihood of stalling a tractor upon engagement of the clutch is practically eliminated.

A further object is the provision of a draft mechanism comprising longitudinally and vertically yieldable members which cooperate to increase the yielding effect when forward force is being applied and which permit a slight rearward pivotal yielding when force resisting forward movement is applied.

Other objects and advantages will become apparent from the following description.

Referring to the accompanying drawings,

Fig. 1 is a side elevation of a fragment of a vehicle draw bar, combined with a draft appliance incorporating my invention;

Fig. 2 is a bottom plan view of that shown in Fig. 1 with a portion broken away to more clearly disclose the interior thereof;

Fig. 3 is a section taken on the line 3—3 of Fig. 1;

Fig. 4 is a section taken on the line 4—4 of Fig. 2;

Fig. 5 is a section taken on the line 5—5 of Fig. 4; and

Fig. 6 is a section taken on the line 6—6 of Fig. 4.

Referring to Figures 1 and 4, the draw bar designated as a whole by numeral 3 consists of two opposed channel members 5 which may extend forwardly from and be a rigid part of any vehicle chassis which is intended to be moved about by means of a tractor or other power mechanism through the medium of a clevis 4. Since neither the tractor nor the trailing vehicle are a part of this invention, the same have been omitted from the drawings and only such parts included as are necessary to show the cooperation of my invention therewith.

On the outer sides of the draw bar 3 and adjacent the front end thereof are fixed reinforcing plates 6 on opposite sides. The plates 6 are held in position by rivets 7' as shown in Figure 3. A cylindrical opening 7 is formed through the plates 6 and the channel members 5 and the sides thereof provide a bearing surface for the bolt 8 on which a bracket 9 is mounted in engagement with the front end of the draw bar. The bracket 9 has a rearwardly extending portion 11 which extends beneath the front end of the draw bar 3 and a portion 12 extends upwardly between the channels 5 and is provided with a hollow cylindrical portion 13 through which the bolt 8 fits for securely holding the bracket 9 in the position shown in Figure 1.

The bracket 9 is preferably hollow for the purpose of lightness and is provided with a downwardly and forwardly extending portion 15 having an opening therethrough through which the bolt 16 passes. The bolt 16 also passes through an upwardly extending portion 17 on a draft element 18 for pivotally securing the same to the bracket 9. The forward end of the draft element is provided with a bore 19 through which is snugly fitted a bolt 21 and is adapted to have relative longitudinal movement with respect to the draft element 18. The front end of the bolt 21 is bifurcated into two ears 22 adapted to receive therebetween a coupler member 23 which is held in place by a bolt 24 as shown in Fig. 2. The coupler 23 has an opening 25 therethrough through which is fitted a bolt 26 which secures the clevis 4 in position such that it may transmit force from any power traction appliance to the draw bolt 21. A cylindrical bore 27 is formed in the front end of bolt 21 and has therein a coil spring 27' which is seated against the bottom of the bore and against a cylindrical block 28 which is forced thereby into contact with the rear side of the coupler 23 for resisting its free movement but permitting movement thereof when sufficient force is applied. The purpose of this arrangement is particularly to aid in the coupling of the draft appliance to the tractor or other traction mechanism.

The rear end of the draft element 18 is formed into a hollow U-shaped trough into which the bolt 21 extends. On the rear end of bolt 21 is placed a washer 31 and a nut 32 through which passes a bolt 33 for securely holding the nut in place. The forward end of the U-shaped trough 34 forms a shoulder 35. A washer 36 engages the shoulder 35 for protecting the shoulder from excessive wear. A relatively heavy coil spring 38 surrounds the rear end of the bolt 21 and is interposed between the washers 31 and 36 for urging rearwardly on the bolt 21 and yieldingly restraining forward longitudinal movement of the bolt 21 when traction force is applied to the same. Adjacent the rear end of the draft element 18 are two integrally formed ears 41 having cylindrical openings 42 vertically therethrough for the purpose of accommodating bolts 43. On the opposite sides of the channel members 5 are rigidly secured by means of bolts 45 hollow bracket members 46 having laterally extending lugs 47. Rectangular cavities 48 are formed on the inner sides of lugs 47 into which are fitted wear blocks 49 which are normally urged against the lateral sides of the member 18 for preventing lateral motion thereof with respect to the draw bar 3 while at the same time permitting vertical movement thereof. Suitable set screws 51 pass through the lugs 47 and engage the wear blocks 49 for holding them in position as shown in Figure 5.

The bracket members 46 are adapted to house and form a part of vertically positioned shock absorbing mechanisms comprising the bolt 43 which passes through the openings 42 in the ears 41. The lower end of bolt 43 is provided with a washer 52 and a nut 53. A tubular member 54 is seated on the upper side of ear 41 and extends upwardly about the bolt 43 and has seated on its upper end a thrust washer 55 and a guide member 56 which cooperate to hold a coil spring 57 in position seated on the thrust washer 55. The upper end of the spring 57 engages the lower side of a combined guide and thrust plate 59 which engages the head 61 on the bolt 43. To adjust the compression force of the spring 54 the nut 53 is tightened or loosened as desired and set screw 62 passing through an opening 63 in the upper end of the bracket 46, which is provided with a suitable lock nut 64 is varied as necessary to prevent excessive lost motion. The bolts 45 which secure the brackets 46 to the channel members 5 pass through openings 68 in the laterally extending lugs 69 on the sides of the bracket 46 and at vertically spaced distances from each other as shown in Figs. 4 and 6.

From the foregoing description it will appear that the draw bolt 21 may yield forwardly when force is applied in that direction for the purpose of moving the draw bar 3 forwardly. Lateral movement and torsional movement of the draft element 18 is prevented but the draw bolt 21 may be turned in position about its longitudinal axis for preventing excessive strains being set up in the draft member 18 when the tractor or other traction device travels over rough ground and produces a torsional force. Lateral movement of the rear end of the draft member 18 is prevented by the wear plates 49 which engage the same and allow vertical movement thereof. The shock absorbing devices contained within brackets 46 permit restrained vertical movement of the rear end of the draft element 18. By this arrangement when rearward force is applied to the draw bolt 21 the draft element 18 will pivot slightly about the bolt 16 and the springs 47 will cushion the backward force. Thus it will be seen that forward longitudinal force is transmitted to the draw bar 3 in such a way as to prevent excessive strains being set up in the vehicle of which the draw bar is a part and at the same time permitting the tractor to gain headway without stalling its engine. Although the rearward force is cushioned to a much less extent, it is sufficient for all practical purposes.

Since the bolt 21 passes through the bore 19 and is snugly fitted therein, the sides of the bore form a guideway which prevents it from moving out of alignment and scraping the sides of the U-shaped trough in which the back end thereof is positioned.

It will be apparent to those skilled in the art that other devices may be designed within the scope of my invention and I do not, therefore, desire to be limited to the specific illustrations shown and described herein except as set forth in the appended claims.

I claim as my invention.

1. In a device of the class described comprising in combination a vehicle draw bar, a draft element pivoted to the forward end thereof and extending horizontally therebeneath, a bolt passing through said draft element, a spring surrounding said bolt and operably engaging said bolt and said draft element and adapted to yieldingly restrain longitudinal movement, a coupling member on the forward end of said bolt, and a resilient mounting for the rear end of said draft element adapted to yieldingly restrain vertical movement thereof.

2. In a draft mechanism in combination, a draw bar, a draw bolt operatively connected thereto, means yieldingly restraining vertical movement of the rear end of said bolt relative to said draw bar, means yieldingly restraining longitudinal movement of said bolt and means confining the forward end of said bolt for longitudinal movement.

3. In a draft mechanism in combination, a draw bar, a draw bolt associated therewith, a spring element for operatively transmitting longitudinal force from said bolt to said bar, means confining the forward end of said bolt from vertical and lateral movement relative to the draw bar, and a plurality of cushioning elements spaced laterally of the rear end of said bolt and operatively connected thereto for yieldingly restraining the vertical movement thereof.

4. In a draft mechanism in combination, a draw bar, a draw bolt associated therewith, a spring element for operatively transmitting longitudinal force from said bolt to said bar, means confining the forward end of said bolt from vertical and lateral movement relative to the draw bar, a plurality of cushioning elements spaced laterally of the rear end of said bolt and operatively connected therewith for yieldingly restraining the vertical movement thereof, and means engaging said bolt intermediate its ends for guiding the same and preventing lateral movement of the rear end of said bolt.

5. In a device of the class described comprising in combination a vehicle draw bar, a draft element pivoted to the forward end thereof and extending horizontally therebeneath, a resilient mounting for the rear end of said draft element adapted to yieldingly restrain vertical movement, and means preventing lateral movement of the rear end of said draft element.

6. In a device of the class described comprising in combination a vehicle draw bar, a draft element pivoted to the forward end thereof and extending horizontally therebeneath, a bolt passing through said draft element, a spring surrounding said bolt and operably engaging said bolt and said draft element and adapted to yieldingly restrain longitudinal movement, a coupling member on the forward end of said bolt, and means preventing lateral movement of the rear end of said draft element.

7. In a draft mechanism in combination, a draw bar, a draft element having one end fixed relative to said draw bar, means yieldingly securing the other end of said draft element to said draw bar, said draft element having a longitudinal bore through a portion thereof forming a guide, a draw bolt passing through the bore in said draft element, and means for transmitting force from said bolt to said draft element.

8. In a draft mechanism in combination, a draw bar, a draft element having one end fixed relative to said draw bar, means yieldingly securing the other end of said draft element to said draw bar, said draft element having a longitudinal bore through a portion thereof forming a guide, a draw bolt passing through the bore in said draft element, and a coil spring positioned about said bolt and operatively interposed between a portion thereof and said draft element for yieldingly restraining longitudinal movement of said bolt.

9. In a draft mechanism in combination, a draw bar, a draft element comprising a guide portion having a longitudinal bore therethrough, means pivoting said draft element to said draw bar, a draw bolt passing through the bore in said guide portion, a coupler element on one end of said bolt and a nut on the other end, a shoulder on said draft element, a spring interposed between said nut and said shoulder for yieldingly restraining longitudinal movement of said bolt.

10. In a draft mechanism in combination, a draw bar, a draft element comprising a guide portion having a longitudinal bore therethrough, means pivoting said draft element to said draw bar, a draw bolt passing through the bore in said guide portion, a coupler element on one end of said bolt and a nut on the other end, a shoulder on said draft element, a spring interposed between said nut and said shoulder for yieldingly restraining longitudinal movement of said bolt, and shock absorbing means fixed to the sides of said draw bar and to said draft element for cushioning vertical movement of said draft element.

11. In a draft mechanism in combination, a draw bar, a draft element comprising a guide portion having a longitudinal bore therethrough, means pivoting said draft element to said draw bar, a draw bolt passing through the bore in said guide portion, a coupler element on one end of said bolt and a nut on the other end, a shoulder on said draft element, a spring interposed between said nut and said shoulder for yieldingly restraining longitudinal movement of said bolt, shock absorbing means fixed to the sides of said draw bar and to said draft element for cushioning vertical movement of said draft element, and means for varying the resistance of said shock absorbing means.

12. In a draft mechanism in combination, a draw bar, a bracket fixed to the front end of said draw bar, a draft element pivoted to said bracket and extending parallel with said draw bar, a draw bolt passing through said draft element, a shoulder on said draft element and a nut on said bolt, a coil spring surrounding said bolt and interposed between said nut and said shoulder for yieldingly resisting longitudinal movement of said bolt with respect to said draft element, a coupler on the front end of said bolt, means preventing lateral movement of the rear end of said draft element and means yieldingly restraining vertical movement thereof.

13. In a device of the class described comprising in combination a vehicle draw bar, a draft element pivoted to the forward end thereof and extending horizontally therebeneath, a bolt passing through said draft element, a spring surrounding said bolt and operably engaging said bolt and said draft member and adapted to yieldingly restrain longitudinal movement, a coupling member pivotally mounted on the forward end of said bolt on an axis transverse to said bolt and yielding means adapted to maintain said coupling member in desired position of adjustment with respect to said bolt.

In witness whereof, I hereunto subscribe my name this 18 day of February, 1930.

JOSEPH KUCHAR.